(12) United States Patent
Doescher et al.

(10) Patent No.: US 11,187,783 B2
(45) Date of Patent: Nov. 30, 2021

(54) RADAR SYSTEMS AND METHODS FOR OPERATING RADAR SYSTEMS

(71) Applicant: NXP B.V., Eindhoven (NL)

(72) Inventors: Michael Johannes Doescher, Hamburg (DE); Abdellatif Zanati, Hamburg (DE); Cicero Silveira Vaucher, Eindhoven (NL)

(73) Assignee: NXP B.V., Eindhoven (NL)

( * ) Notice: Subject to any disclaimer, the term of this patent is extended or adjusted under 35 U.S.C. 154(b) by 231 days.

(21) Appl. No.: 16/103,866

(22) Filed: Aug. 14, 2018

(65) Prior Publication Data
US 2020/0057136 A1    Feb. 20, 2020

(51) Int. Cl.
*G01S 7/35* (2006.01)
*G01S 13/58* (2006.01)

(52) U.S. Cl.
CPC ............ *G01S 7/352* (2013.01); *G01S 13/584* (2013.01)

(58) Field of Classification Search
CPC ...... G01S 7/352; G01S 13/584; G01S 13/931; G01S 7/023
USPC .......................................................... 342/98
See application file for complete search history.

(56) References Cited

U.S. PATENT DOCUMENTS

| 4,309,703 A | * | 1/1982 | Blahut | G01S 13/286 |
|---|---|---|---|---|
| | | | | 342/201 |
| 5,351,053 A | * | 9/1994 | Wicks | G01S 13/0209 |
| | | | | 342/140 |
| 5,410,621 A | * | 4/1995 | Hyatt | G07G 1/12 |
| | | | | 382/260 |
| 5,926,125 A | * | 7/1999 | Wood | G01S 13/106 |
| | | | | 342/25 F |
| 5,966,371 A | * | 10/1999 | Sherman | H04B 7/18513 |
| | | | | 370/320 |

(Continued)

FOREIGN PATENT DOCUMENTS

| CN | 103138799 A | 6/2013 |
|---|---|---|
| CN | 106454981 A | 2/2017 |

(Continued)

OTHER PUBLICATIONS

Kunert et al.; "Mutual and incumbent frequency user interference thread for automotive radar systems—a general overview and useful mitigation techniques", GmbH, European Microwave Week 2017; 34 pgs.

(Continued)

*Primary Examiner* — Peter M Bythrow
*Assistant Examiner* — Nuzhat Pervin

(57) ABSTRACT

Embodiments of a method and a device are disclosed. In an embodiment, a method for operating a radar system is disclosed. The method involves generating a chirp signal having a repeating pattern of chirps, each chirp in the repeating pattern of chirps having a base frequency and a chirp bandwidth, wherein the repeating pattern of chirps includes at least two chirps that differ from each other in at least one of base frequency and chirp bandwidth, transmitting a radar signal according to the chirp signal, receiving radio frequency energy that includes a reflected portion of the radar signal, and selecting for processing from the received radio frequency energy a signal that matches the repeating pattern of chirps of the chirp signal.

20 Claims, 12 Drawing Sheets

(56) References Cited

U.S. PATENT DOCUMENTS

| | | | |
|---|---|---|---|
| 7,215,278 B2* | 5/2007 | Bandhauer | G01S 7/4004 |
| | | | 342/137 |
| 7,323,991 B1* | 1/2008 | Eckert | G07C 9/28 |
| | | | 340/572.1 |
| 9,019,143 B2* | 4/2015 | Obermeyer | G01S 13/9029 |
| | | | 342/25 R |
| 9,294,238 B2* | 3/2016 | Dahlman | H04W 72/042 |
| 9,853,365 B2* | 12/2017 | Kumar Y. B. | G01S 7/35 |
| 2005/0104765 A1* | 5/2005 | Bandhauer | G01S 13/0209 |
| | | | 342/82 |
| 2005/0156780 A1* | 7/2005 | Bonthron | G01S 13/931 |
| | | | 342/107 |
| 2006/0227316 A1* | 10/2006 | Gatt | G01S 7/4811 |
| | | | 356/5.09 |
| 2006/0239119 A1* | 10/2006 | Hartka | G01S 13/90 |
| | | | 367/87 |
| 2007/0069943 A1* | 3/2007 | Adams | G01S 17/88 |
| | | | 342/130 |
| 2007/0285302 A1* | 12/2007 | Aarseth | G01S 13/9019 |
| | | | 342/25 R |
| 2009/0102705 A1* | 4/2009 | Obermeyer | H01Q 1/28 |
| | | | 342/25 F |
| 2010/0234071 A1* | 9/2010 | Shabtay | H04B 7/155 |
| | | | 455/562.1 |
| 2011/0122014 A1* | 5/2011 | Szajnowski | G01S 13/26 |
| | | | 342/109 |
| 2014/0197983 A1* | 7/2014 | Reuter | G01S 13/343 |
| | | | 342/200 |
| 2014/0370879 A1* | 12/2014 | Redding | H04M 3/42178 |
| | | | 455/419 |
| 2016/0103204 A1* | 4/2016 | Valentine | G01S 7/022 |
| | | | 342/20 |
| 2016/0124075 A1* | 5/2016 | Vogt | G01S 13/343 |
| | | | 342/13 |
| 2017/0082744 A1* | 3/2017 | Matsumoto | G01S 7/352 |
| 2017/0219687 A1* | 8/2017 | Valentine | G01S 7/022 |
| 2017/0219688 A1* | 8/2017 | Valentine | G01S 7/022 |
| 2017/0219689 A1* | 8/2017 | Hung | G01S 7/0233 |
| 2017/0285135 A1* | 10/2017 | Valentine | G01S 7/285 |
| 2017/0311254 A1* | 10/2017 | Ly | H04W 74/0833 |
| 2017/0339073 A1* | 11/2017 | Champion | H04L 1/0045 |
| 2017/0343648 A1* | 11/2017 | Trotta | G01S 13/34 |
| 2018/0003799 A1* | 1/2018 | Yang | G01S 7/354 |
| 2018/0031688 A1* | 2/2018 | Hesse | G01S 13/931 |
| 2018/0095162 A1* | 4/2018 | Fetterman | G01S 13/343 |
| 2018/0095173 A1* | 4/2018 | Kurono | G01S 13/584 |
| 2018/0113191 A1* | 4/2018 | Villeval | G01S 7/0232 |
| 2018/0113192 A1* | 4/2018 | Bialer | G01S 7/282 |
| 2018/0136324 A1* | 5/2018 | Klotzbuecher | G01S 13/343 |
| 2018/0136328 A1* | 5/2018 | Moss | G01S 13/584 |
| 2018/0149741 A1* | 5/2018 | Janssen | G01S 7/292 |
| 2018/0252809 A1* | 9/2018 | Davis | G01S 13/931 |
| 2019/0011558 A1* | 1/2019 | Crouch | H04L 12/2801 |
| 2019/0064362 A1* | 2/2019 | Scott | G01S 13/885 |
| 2020/0057140 A1* | 2/2020 | Vigier | G01S 7/5203 |
| 2020/0088842 A1* | 3/2020 | Swanson | G01S 13/88 |

FOREIGN PATENT DOCUMENTS

| | | | | |
|---|---|---|---|---|
| CN | 106680790 A | | 5/2017 | |
| CN | 107167775 A | | 9/2017 | |
| EP | 0031442 A2 * | | 7/1981 | G01S 13/286 |
| EP | 0423715 A2 | | 4/1991 | |
| GB | 2487374 A * | | 7/2012 | G01S 13/581 |
| JP | 2005195450 A | | 7/2005 | |
| KR | 20110114795 A | | 10/2011 | |
| WO | WO-2005069905 A2 * | | 8/2005 | G01S 13/931 |
| WO | WO-2007044717 A1 * | | 4/2007 | G01S 7/35 |
| WO | WO-2007084152 A2 * | | 7/2007 | H01Q 3/26 |
| WO | WO-2012143756 A1 * | | 10/2012 | G01S 7/352 |
| WO | 2017069681 A1 | | 4/2017 | |
| WO | 2017165556 A1 | | 9/2017 | |
| WO | WO-2019215732 A1 * | | 11/2019 | G01S 7/023 |
| WO | WO-2019215734 A1 * | | 11/2019 | G01S 13/343 |

OTHER PUBLICATIONS

Maric et al.; "A class of frequency hop codes with nearly ideal characteristics for use in multiple-access spread-spectrum communications and radar and sonar systems", IEEE Transactions on Communications, 40(9), Sep. 1992; 6 pgs.

* cited by examiner

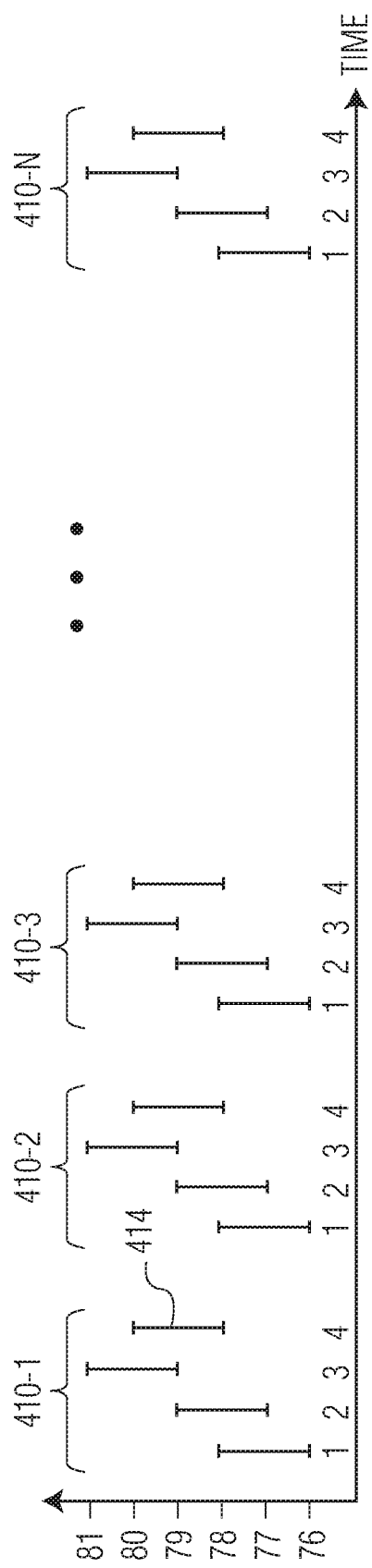

RADAR SYSTEMS AND METHODS FOR OPERATING RADAR SYSTEMS

BACKGROUND

Sensor systems that utilize radar are increasing being deployed in vehicles (e.g., automobiles) to implement, for example, safety and/or autonomous driving features. As is known in the field, a radar system transmits radio waves and receives a reflected portion of the radio waves and then uses the round trip delay to detect the presence of an object. Although radar works well to detect the presence of objects, radar systems are subject to interference that can degrade the accuracy of object detection. For example, when a large number of vehicles that are using radar systems are located near each other, the radar signals from the different vehicles may interfere with each other and the detection of objects can become unreliable. When radar systems are employed to implement safety and/or autonomous driving features, the reliability of radar systems is of utmost importance.

SUMMARY

Embodiments of a method and a device are disclosed. In an embodiment, a method for operating a radar system is disclosed. The method involves generating a chirp signal having a repeating pattern of chirps, each chirp in the repeating pattern of chirps having a base frequency, a chirp bandwidth, and a chirp duration, wherein the repeating pattern of chirps includes at least two chirps that differ from each other in at least one of base frequency, chirp bandwidth, and chirp duration, transmitting a radar signal according to the chirp signal, receiving radio frequency energy that includes a reflected portion of the radar signal, and selecting for processing from the received radio frequency energy a signal that matches the repeating pattern of chirps of the chirp signal.

In an embodiment, the repeating pattern of chirps comprises a fixed number of chirps in each repeating pattern.

In an embodiment, the repeating pattern of chirps includes at least two chirps that have different base frequencies.

In an embodiment, the repeating pattern of chirps includes at least two chirps that have different chirp bandwidths.

In an embodiment, the repeating pattern of chirps includes at least two chirps that have different base frequencies and at least two chirps that have different chirp bandwidths.

In an embodiment, the repeating pattern of chirps comprises a fixed number of chirps in each repeating pattern and wherein the repeating pattern of chirps includes at least two chirps that have different base frequencies and at least two chirps that have different chirp bandwidths.

In an embodiment, generating the chirp signal involves accessing a chirp code stored in the radar system, wherein the chirp code defines the pattern of chirps.

A radar system is also disclosed. The radar system includes a waveform generator configured to generate a chirp signal having a repeating pattern of chirps, each chirp in the repeating pattern of chirps having a base frequency, a chirp bandwidth, and a chirp duration, wherein the repeating pattern of chirps includes at least two chirps that differ from each other in at least one of base frequency, chirp bandwidth, and chirp duration, transmitter circuitry configured to transmit a radar signal according to the chirp signal, receiver circuitry configured to receive radio frequency energy that includes a reflected portion of the radar signal, wherein the radar system is configured to select, from the received radio frequency energy a signal that matches the repeating pattern of chirps of the chirp signal.

In an embodiment of the radar system, the repeating pattern of chirps comprises a fixed number of chirps in each repeating pattern.

In an embodiment of the radar system, the repeating pattern of chirps includes at least two chirps that have different base frequencies.

In an embodiment of the radar system, the repeating pattern of chirps includes at least two chirps that have different chirp bandwidths.

In an embodiment of the radar system, the repeating pattern of chirps includes at least two chirps that have different base frequencies and at least two chirps that have different chirp bandwidths.

In an embodiment of the radar system, the repeating pattern of chirps comprises a fixed number of chirps in each repeating pattern and wherein the repeating pattern of chirps includes at least two chirps that have different base frequencies and at least two chirps that have different chirp bandwidths.

In an embodiment of the radar system, generating the chirp signal involves accessing a chirp code stored in the radar system, wherein the chirp code defines the pattern of chirps.

A packaged device for a radar system is disclosed. The packaged device includes a waveform generator configured to generate a chirp signal having a repeating pattern of chirps, each chirp in the repeating pattern of chirps having a base frequency, a chirp bandwidth, and a chirp duration, wherein the repeating pattern of chirps includes at least two chirps that differ from each other in at least one of base frequency, chirp bandwidth, and chirp duration, transmitter circuitry configured to transmit a radar signal according to the chirp signal, and a receiver circuitry configured to receive radio frequency energy that includes a reflected portion of the radar signal.

In an embodiment, the packaged device includes a memory on which a chirp code is stored, wherein the chirp code defines the pattern of chirps.

In an embodiment, the packaged device is configured to select, from the received radio frequency energy, a signal that matches the repeating pattern of chirps of the chirp signal.

In an embodiment, the repeating pattern of chirps comprises a fixed number of chirps in each repeating pattern.

In an embodiment, the repeating pattern of chirps includes at least two chirps that have different base frequencies or at least two chirps that have different chirp bandwidths.

In an embodiment, the repeating pattern of chirps includes at least two chirps that have different base frequencies and at least two chirps that have different chirp bandwidths.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 4A depicts a repeating pattern of N chirp frames that include four chirps per chirp frame.

Throughout the description, similar reference numbers may be used to identify similar elements.

DETAILED DESCRIPTION

Figure 1:
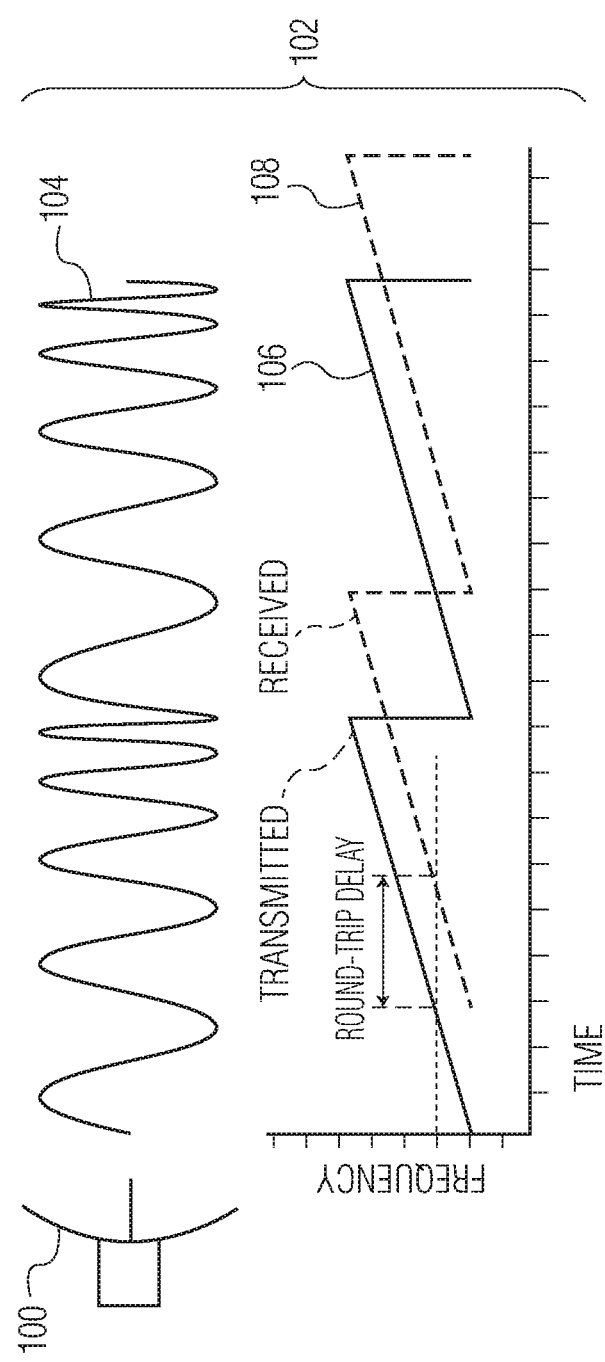
FIG. 1 depicts a continuous wave carrier that is modulated by a fast sequence of chirps.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Modern driver assistance features, including autonomous driving, require deployment of multiple sensor systems, such as cameras, radar, and Lidar. To be effective, sensing systems such as radar must have highly reliable received signals. Radar interference may arise from, for example: emissions from non-transmitting devices (e.g., such as high power electronics); spurious, in-band, or out-of-band emissions from incumbent users in the same or similar frequency range (e.g., mobile communications and aerospace radar); and spurious, in-band, or out-of-band emissions from different vehicle radar systems of the same or similar kind, in the same or close-by vehicles. Radio frequency energy from the same or similar type of radar systems can result in particularly harmful interference that affects the primary function of the system or its functional safety.

Hence, radar interference mitigation techniques are important, especially in multiple-vehicle or multiple-sensors-per-vehicle situations. Interference can result in, for example, ghost targets or in real targets, which are falsely interpreted as ghost targets and neglected for the wrong reason. Real targets also can be misinterpreted in terms of, for example, their proximity, speed, and/or size.

Interference can occur if the following conditions are simultaneously met: a) the interference signal occupies the same bandwidth; b) at the same time; c) at the same location; d) with a common interference path (either line of sight or reflection/diffraction); e) with the same polarization; f) with different, uncorrelated carrier(s); g) with different, uncorrelated modulation schemes; and h) with received interference power that is perceivable, e.g., in terms of the interference to noise (UN) power ratio.

Interference mitigation or avoidance can be implemented by influencing one or more of the above mentioned parameters. In the case of different vehicle radar systems of the same or similar kind, in the same or nearby vehicles, interfering signals are present at the same time, at the same location, and with a common interference path. Thus, interference mitigation or avoidance techniques typically involve manipulating the carrier frequency, the carrier polarization, and/or the modulation scheme. One approach to interference mitigation in vehicle radar systems utilizes random frequency hopping. According to the approach, a radar signal is distributed randomly over the entire band, then backwards convoluted to eliminate the interference. Such an approach can be considered as a special "spread spectrum" approach that is well known in the field. However, conventional systems require considerable computing power to provide an acceptable correlation between the sent and the received signal. For example, in the document "Interference-tolerant multiple-user radar system," (WO 2017/165556 A1), it was shown that such a technique can provide a clear distinction between 22 potentially interfering radar channels when 23 frequency hops are made. However, the hardware requirements to allow for real-time computing of correlation coefficients are huge and likely impractical for vehicle deployment.

It is also desirable that interference mitigation or avoidance techniques do not rely on vehicle-to-vehicle or sensor-to-sensor communication, which would impose an additional layer of complexity and risk of failure and may require a standardized communications protocol.

Widely implemented vehicle radar systems use frequency-modulated continuous wave (FMCW) modulation to sense objects. Using FMCW, a (quasi-) continuous carrier frequency of for example, 77 GHz, is modulated by a "fast" sequence of quick upward (or downward) frequency sweeps of around, for example, 1-2 GHz. The quick upward (or downward) frequency sweeps typically have a duration (in time) in the range of about 100 us, in some applications the duration is in the range of 20-50 us, and are often referred to as "chirps" or "ramps."

FIG. 1 depicts a continuous wave carrier that is modulated by a fast sequence of chirps, e.g., an FMCW signal. In particular, FIG. 1 depicts a radar transmitter 100 and time synchronized representations of the continuous wave carrier signal in a wave form 102 and the continuous wave carrier signal in a graph form 106 of frequency vs. time. The quick upward frequency sweeps ("chirps" or "ramps") of the FMCW signal are identifiable in both representations of the continuous wave carrier. Some known vehicle radar systems operate in a 77 GHz band that ranges from 76 GHz-81 GHz, although the system described herein is not limited to such a band. Other known vehicle radar systems operate in a 24 GHz band, however, the 24 GHz frequency band has been found to be susceptible to interference from radio astronomy and satellite services. Because of the potential for interference, the automotive market is moving away from the 24 GHz band and it appears that the 77 GHz band will grow in importance over the coming years. Additionally, other higher frequency bands for vehicle radar systems are possible.

Referring again to FIG. 1 and as is known in the field, when operating a radar system, a portion of the transmitted radar signal 106 is reflected by relatively large objects and the reflected portion of the radar signal 108 is received by an antenna system. The frequency difference between the transmitted and reflected chirp (caused by the flight time of the radar signal), referred to as the round-trip delay, provides information on the distance between the transmitter and the object off which the signal is reflected (i.e., the reflector). Similarly, the relative speed between the transmitter and the reflector causes a Doppler shift that can be evaluated to obtain information on the relative speed between the transmitter and the reflector.

Figure 2:
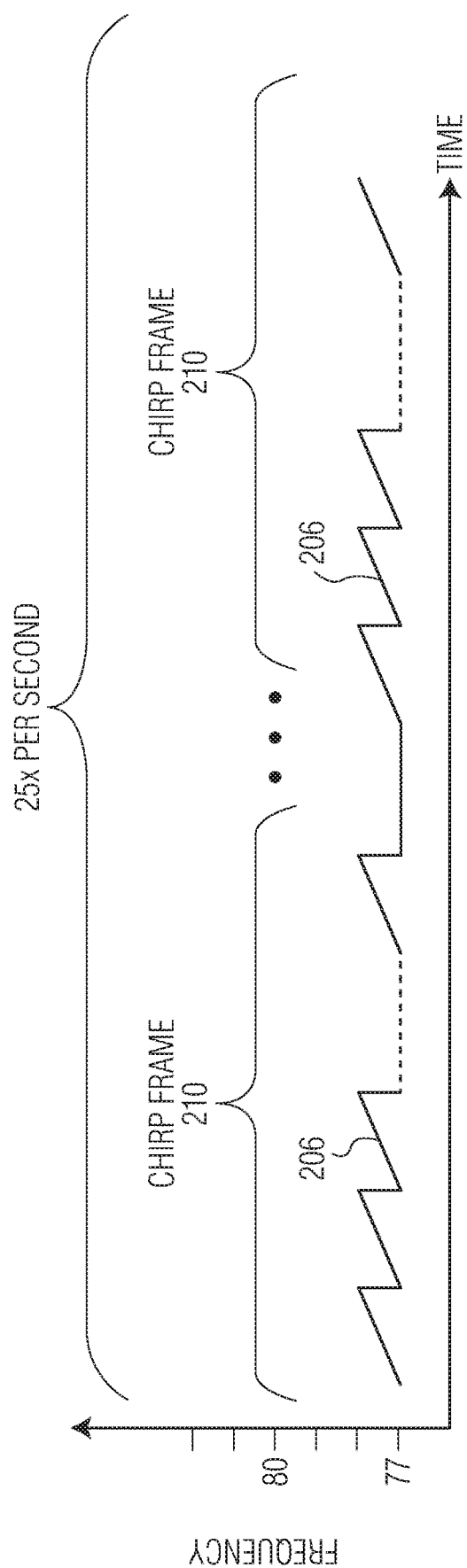
FIG. 2 depicts a larger portion of a frequency-modulated carrier wave (FMCW) signal that includes a repeating pattern of 25 chirp frames, wherein each chirp frame includes the same number of chirps, e.g., 32 or 64 chirps.

While FIG. 1 depicts only a small portion of an FMCW signal, FIG. 2 depicts a larger portion of an FMCW signal 206 that includes a repeating pattern of 25 chirp frames 210, wherein each chirp frame includes the same number of chirps, e.g., 32 or 64 chirps, with each chirp having the same chirp duration. As shown in FIG. 2, each chirp in the chirp frames has a base frequency of 77 GHz and a chirp bandwidth of 1 GHz. In one known vehicle sensing application, twenty-five chirp frames (of either 32 chirps or 64 chirps per frame) are transmitted per second (e.g., 25 frames-per-second (fps)).

Although vehicle radar systems that utilize FMCW work well to detect objects, problems can arise for a first vehicle if multiple other vehicles transmit radar signals in the same limited frequency band at the same time, at the same location, with a common interference path such that a multitude of transmitted and reflected signals are received by the radar system of the first vehicle. Such signals are normally uncorrelated and therefore can cause a noise floor and interference in the signal processing unit of the first vehicle. Therefore, the noise signals need to be filtered out and suppressed to prevent system overload and/or a poor signal-to-noise ratio. As all disturbing signals cause the resolution and accuracy of the first vehicle to suffer, mitigating unwanted interference is of paramount importance to ensure error-free detection of signals from relevant objects. Interference mitigation can be especially problematic in urban areas where many cars are present at the same time and using the same frequency bands.

In accordance with an embodiment of the invention, a method for operating a radar system for a vehicle (e.g., an automobile) to mitigate interference involves generating a chirp signal having a repeating pattern of chirps, with each chirp in the repeating pattern of chirps having a base frequency, a chirp bandwidth, and a chirp duration, wherein the repeating pattern of chirps includes at least two chirps that differ from each other in at least one of base frequency, chirp bandwidth, and chirp duration, transmitting a radar signal according to the chirp signal, receiving radio frequency energy that includes a reflected portion of the radar signal, and selecting for processing from the received radio frequency energy a signal that matches the repeating pattern of chirps of the chirp signal. In an embodiment, the base frequency, chirp bandwidth, and/or chirp duration of a repeating pattern of chirps can be used to create a large enough pool of unique patterns or "fingerprints" that interference amongst nearby vehicles is highly unlikely or avoided altogether. Additionally, other parameters, such as the number of chirps in a chirp frame or the wait time between two chirps, can be used to create a large pool of unique patterns or "fingerprints." The use of a large pool of unique patterns to mitigate interference from nearby vehicles does not rely on vehicle-to-vehicle communications, thus eliminating the need for additional communications equipment and/or communications protocols. Additionally, the technique can be used in an environment that includes vehicles that are equipped with radar systems that implement the technique described herein and vehicles that are not equipped with such radar systems (e.g., including vehicles that are equipped with legacy radar systems).

Figure 3A:
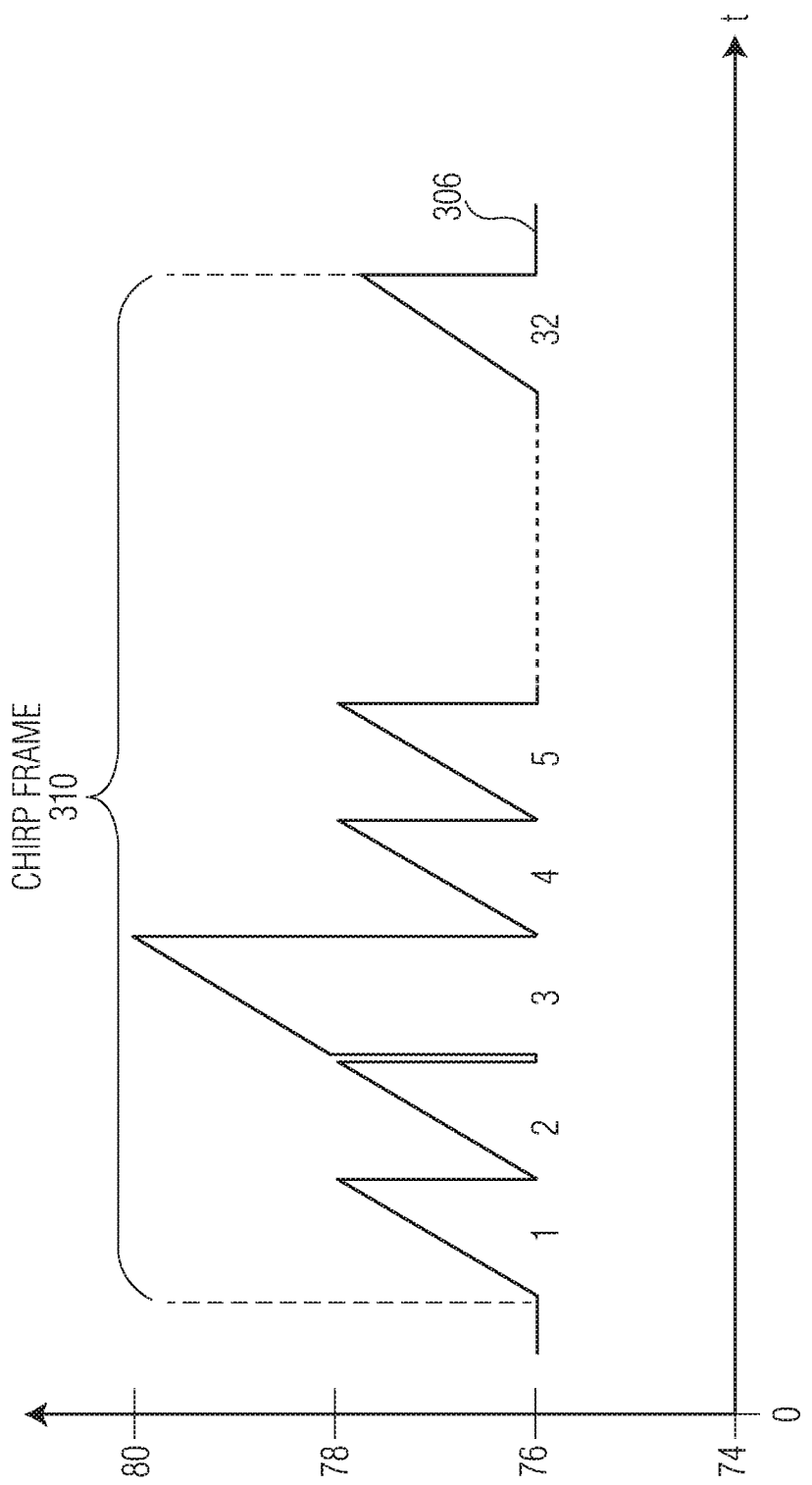
FIG. 3A-3D depict examples of a chirp frame in a portion of an FMCW signal that uses two different base frequencies, chirp bandwidths, and/or chirp durations to create a unique pattern or "fingerprint" of chirps.

FIGS. 3A-3D depict examples of a chirp frame in which the base frequency, chirp bandwidth, and/or chirp duration of a repeating pattern of chirps is used to create a unique pattern or "fingerprint." FIG. 3A depicts an example of a chirp frame 310 in a portion of an FMCW signal 306 that uses two different base frequencies to create a unique pattern or "fingerprint" of chirps. In the example of FIG. 3A, the chirp frame has thirty-two chirps, with thirty-one of the thirty-two chirps having a base frequency of 76 GHz and one chirp of the thirty-two chirps having a base frequency of 78 GHz. In the example of FIG. 3A, each chirp has the same chirp bandwidth (e.g., 2 GHz) and the base frequency is used to create the unique pattern of chirps. The unique pattern of chirps shown in FIG. 3A can be represented as, for example, low(1), low(2), high(3), low(4), low(5), . . . , low(32). In the example of FIG. 3A, chirps 1, 2, and 4-32 have a base frequency of 76 GHz and a chirp bandwidth of 2 GHz and chirp 3 has a base frequency of 78 GHz and a chirp bandwidth of 2 GHz. Using the example of FIG. 3A, a chirp frame can have $2^{32}$ (or $4.3 \times 10^9$) unique chirp patterns or fingerprints. In operation, the chirp frame 310 with the unique chirp pattern is repeated with a pause in between chirp frames.

Figure 3B:
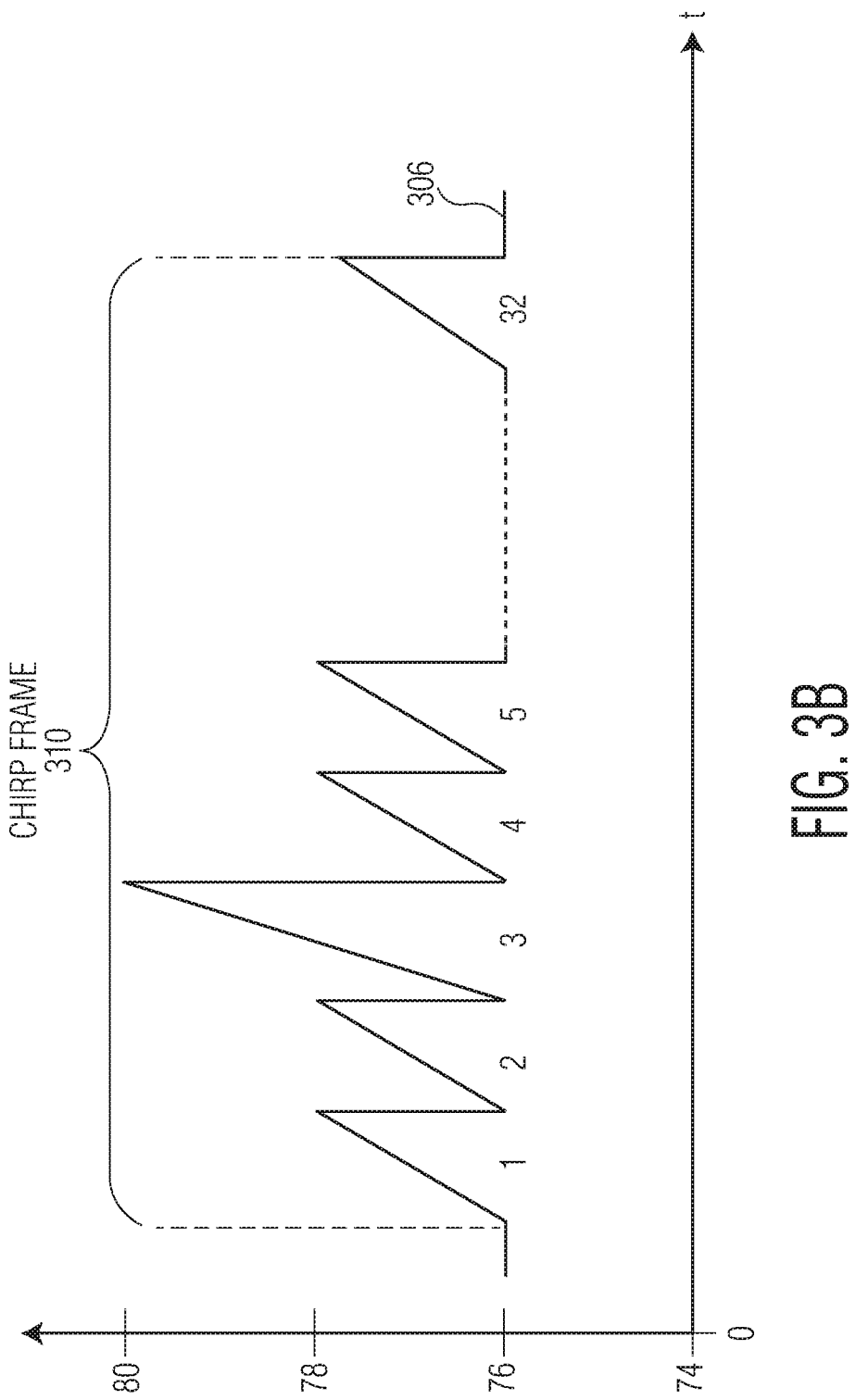

FIG. 3B depicts an example of a chirp frame 310 in a portion of an FMCW signal 306 that uses two different chirp bandwidths to create a unique pattern or "fingerprint" of chirps. In the example of FIG. 3B, the chirp frame has thirty-two chirps, with thirty-one of the thirty-two chirps having a chirp bandwidth of 2 GHz and one chirp of the thirty-two chirps having a chirp bandwidth of 4 GHz. In the example of FIG. 3B, each chirp has the same base frequency (e.g., 76 GHz) and the chirp bandwidth is used to create the unique pattern of chirps.

Figure 3C:
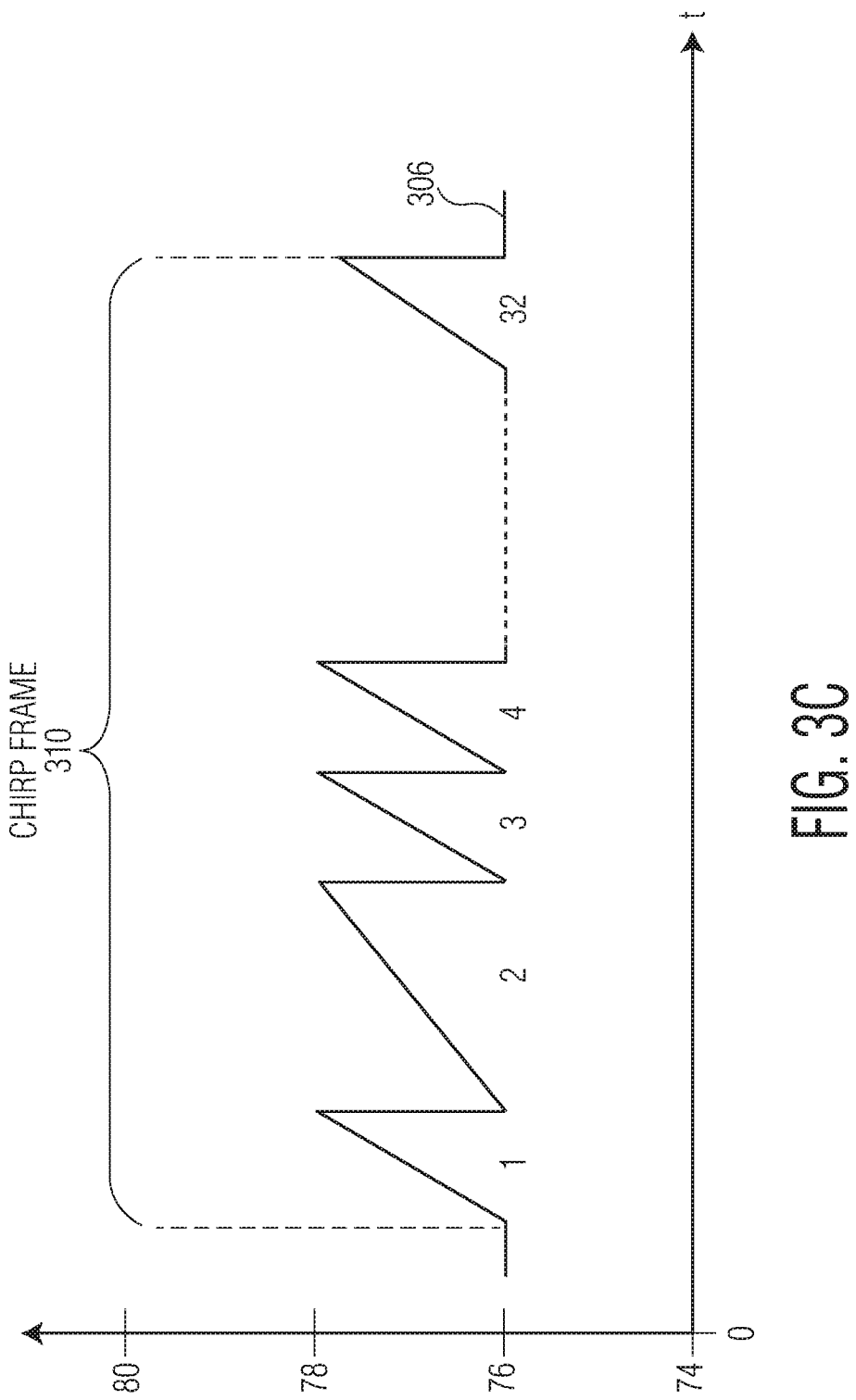

FIG. 3C depicts an example of a chirp frame 310 in a portion of an FMCW signal 306 that uses two different chirp durations to create a unique pattern or "fingerprint" of chirps. In the example of FIG. 3C, the chirp frame has thirty-two chirps, with thirty-one of the thirty-two chirps having a first chirp duration and one chirp of the thirty-two chirps having a second chirp duration (e.g., twice as long as the first chirp duration). In the example of FIG. 3C, each chirp has the same base frequency (e.g., 76 GHz) and the same chirp bandwidth (e.g., 2 GHz) and the chirp duration is used to create the unique pattern of chirps.

Figure 3D:
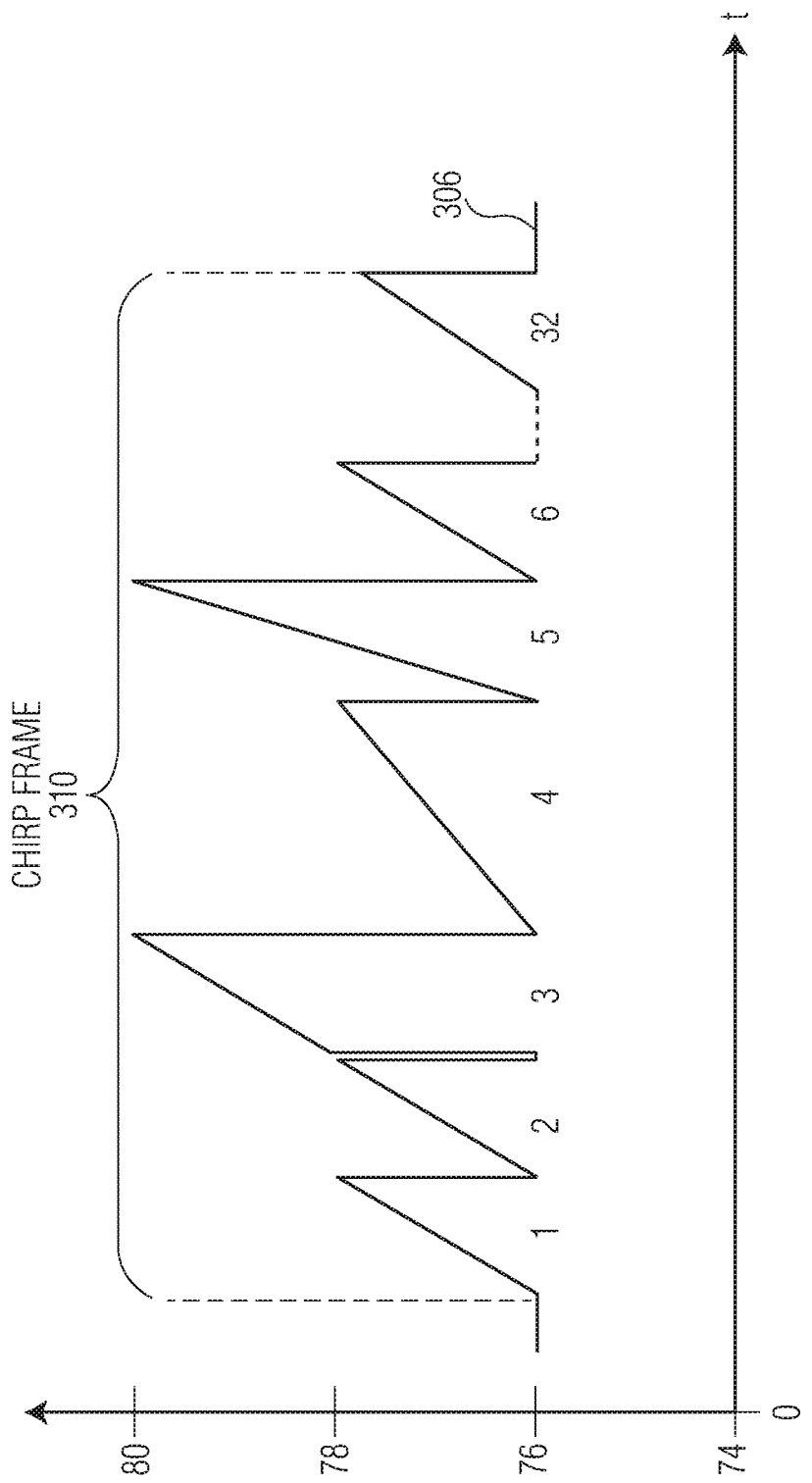

FIG. 3D depicts an example of a chirp frame 310 in a portion of an FMCW signal 306 that uses a combination of different base frequencies, chirp bandwidths, and chirp durations in the same chirp frame to create a unique pattern or "fingerprint" of chirps. In the example of FIG. 3D, the chirp frame has thirty-two chirps, with at least one chirp having a base frequency of 78 GHz (as opposed to 76 GHz), with at least one chirp having a chirp duration different from the other chirps (e.g., one chirp having a chirp duration that is twice as long as the other chirps), and with at least one chirp having a chirp bandwidth of 4 GHz (as opposed to 2 GHz). Although a combination of three variable parameters is shown in FIG. 3D, a combination of just two of the variable parameters (e.g., base frequency/chirp bandwidth, base frequency/chirp duration, chirp bandwidth/chirp duration) is also possible.

The unique chirp patterns depicted in FIGS. 3A-3C involve a chirp frame 310 with thirty-two chirps and one variable parameter (i.e., base frequency, chirp bandwidth, and chirp duration, respectively) and FIG. 3D depicts a chirp pattern with three variables (i.e., base frequency, chirp bandwidth, and chirp duration). Other combinations of variable parameters (e.g., base frequency, chirp bandwidth, and chirp duration) can be used to create a large pool of unique patterns of chirps. FIGS. 4A-4D depict four different examples of unique patterns, or fingerprints, which can be created by manipulating a combination of the number of chirps per chirp frame, the base frequency of each chirp, and the chirp bandwidth of each chirp. In the examples of FIGS. 4A-4D, the chirps of the FMCW signal are represented as vertical lines in which the bottom end of the line corresponds to the base frequency of the chirp and the length of the vertical line corresponds to the chirp bandwidth (e.g., the increase in the chirp frequency over the duration of the chirp) over the chirp duration. The chirp duration is the time over which a chirp occurs (e.g., the distance on the time axis from the beginning to the end of a single chirp). In the examples of FIGS. 4A-4D, each vertical line illustrates a chirp of the FMCW signal.

FIG. 4A depicts a repeating pattern of N chirp frames 410-1-410-N, where N is an integer greater than zero. The chirp frames depicted in FIG. 4A include four chirps 414 of equal chirp duration per chirp frame (numbered 1-4), with the four chirps having four different possible base frequencies (76 GHz, 77 GHz, 78 GHz, and 79 GHz) and with each chirp having the same chirp bandwidth, 2 GHz. In this example, each chirp has four degrees of freedom (76 GHz, 77 GHz, 78 GHz, and 79 GHz) and there are four chirps per frame. Using the example of FIG. 4A, a chirp frame can have $4^4$ (or 256) unique chirp patterns or fingerprints.

Figure 4B:
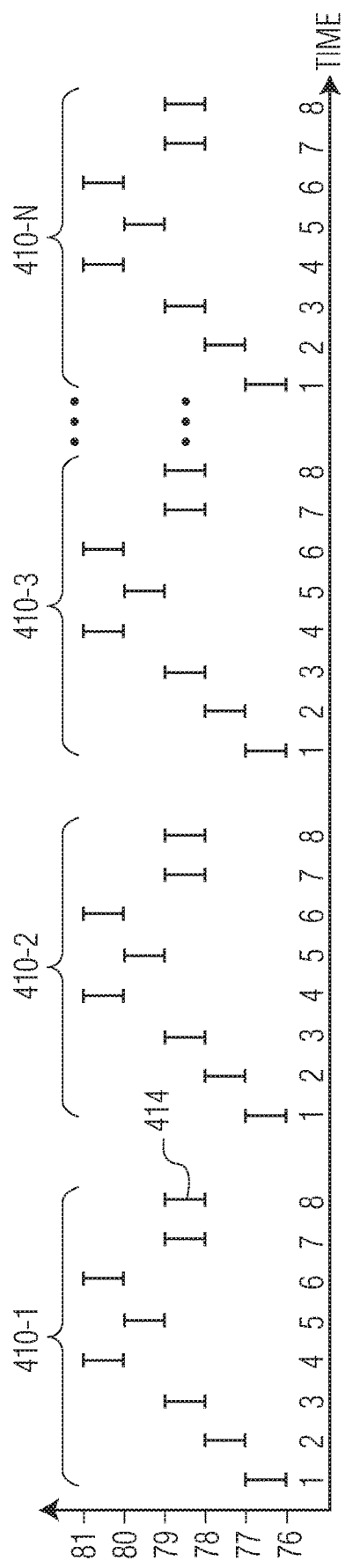
FIG. 4B depicts a repeating pattern of N chirp frames that include eight chirps per chirp frame.

FIG. 4B depicts a repeating pattern of N chirp frames 410-1-410-N, where N is an integer greater than zero. The chirp frames depicted in FIG. 4B include eight chirps 414 of equal chirp duration per chirp frame (numbered 1-8), with the eight chirps having five different possible base frequencies (76 GHz, 77 GHz, 78 GHz, 79 GHz, and 80 GHz) and with each chirp having the same chirp bandwidth, 1 GHz. In this example, each chirp has five degrees of freedom (76 GHz, 77 GHz, 78 GHz, 79 GHz, and 80 GHz) and there are eight chirps per frame). Using the example of FIG. 4B, a chirp frame can have $5^8$ (or 390,625) unique chirp patterns or fingerprints.

Figure 4C:
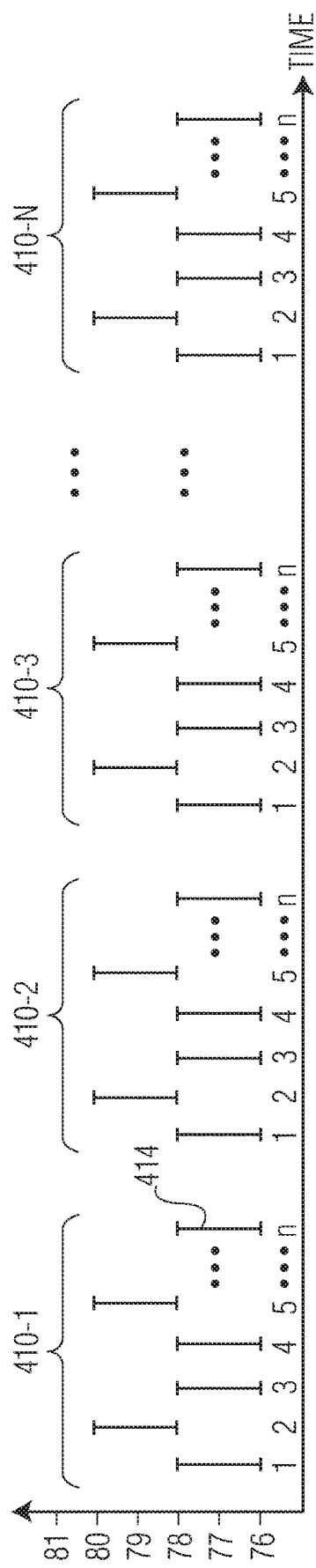
FIG. 4C depicts a repeating pattern of N chirp frames that include n chirps per chirp frame.

FIG. 4C depicts a repeating pattern of N chirp frames 410-1-410-N, where N is an integer greater than zero. The chirp frames depicted in FIG. 4C include n chirps 414 of equal chirp duration per chirp frame (wherein n is an integer greater than zero, for example, n=32 or n=64), with the n chirps having two different base frequencies (76 GHz and 78 GHz) and with each chirp having the same chirp bandwidth, 2 GHz. In this example, each chirp has two degrees of freedom (76 GHz and 78 GHz) and there are n chirps per frame). Using the example of FIG. 4C, a chirp frame can have $2^n$ unique chirp patterns or fingerprints. For example, where n=64, a chirp frame can have $2^{64}$ (or $1.8 \times 10^{19}$) unique chirp patterns.

Figure 4D:
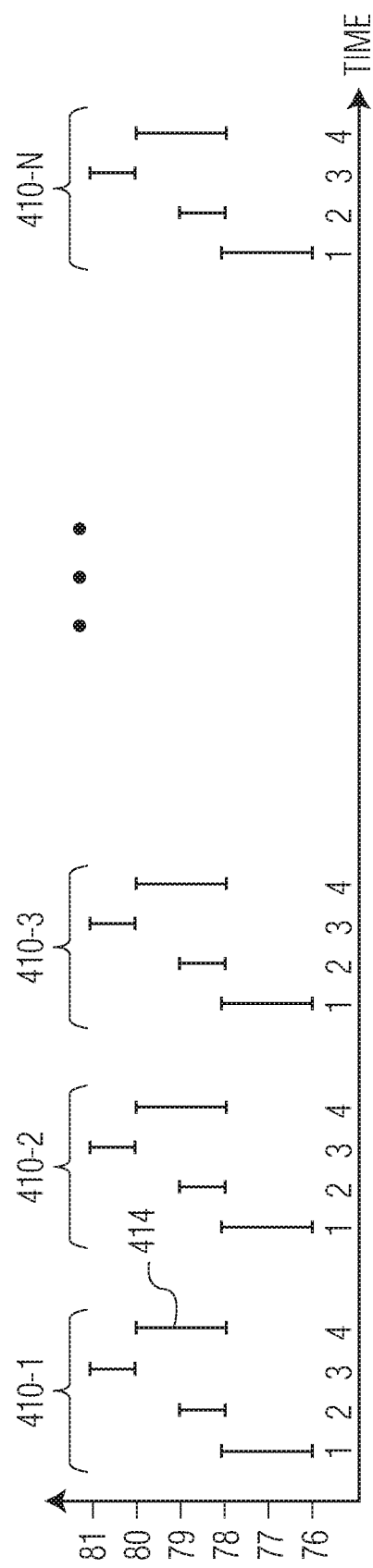
FIG. 4D depicts a repeating pattern of N chirp frames that include four chirps per chirp frame.

In an embodiment, the base frequency and the chirp bandwidth can be varied within a single chirp frame to increase the degrees of freedom. FIG. 4D depicts a repeating pattern of N chirp frames 410-1-410-N of equal chirp duration, where N is an integer greater than zero, in which the base frequency and the chirp bandwidth are varied within a single chirp frame to increase the degrees of freedom. The chirp frames depicted in FIG. 4D include four chirps 414 per chirp frame (numbered 1-4), with the four chirps having base frequencies of 76 GHz, 78 GHz, 80 GHz, and 78 GHz and with the chirps having a chirp bandwidth of either 1 GHz or 2 GHz. In an embodiment, a pattern that includes 24 chirps per frame, 5 different base frequencies, and 2 different chirp bandwidths produces a pool of $(2 \times 5)^{24}$ (or $10^{24}$) unique chirp patterns. In still other embodiments, the chirp duration may be varied to provide another degree of freedom. For practical purposes, such a large pool of unique chirp patterns is enough to allow each radar system to be considered "quasi-unique" without taking further measures to ensure absolute uniqueness. Larger chirp frames (e.g., more chirps per chirp frame) and the use of different alterations of base frequency and chirp bandwidth can be used to increase the number of unique chirp patterns.

Figure 5:
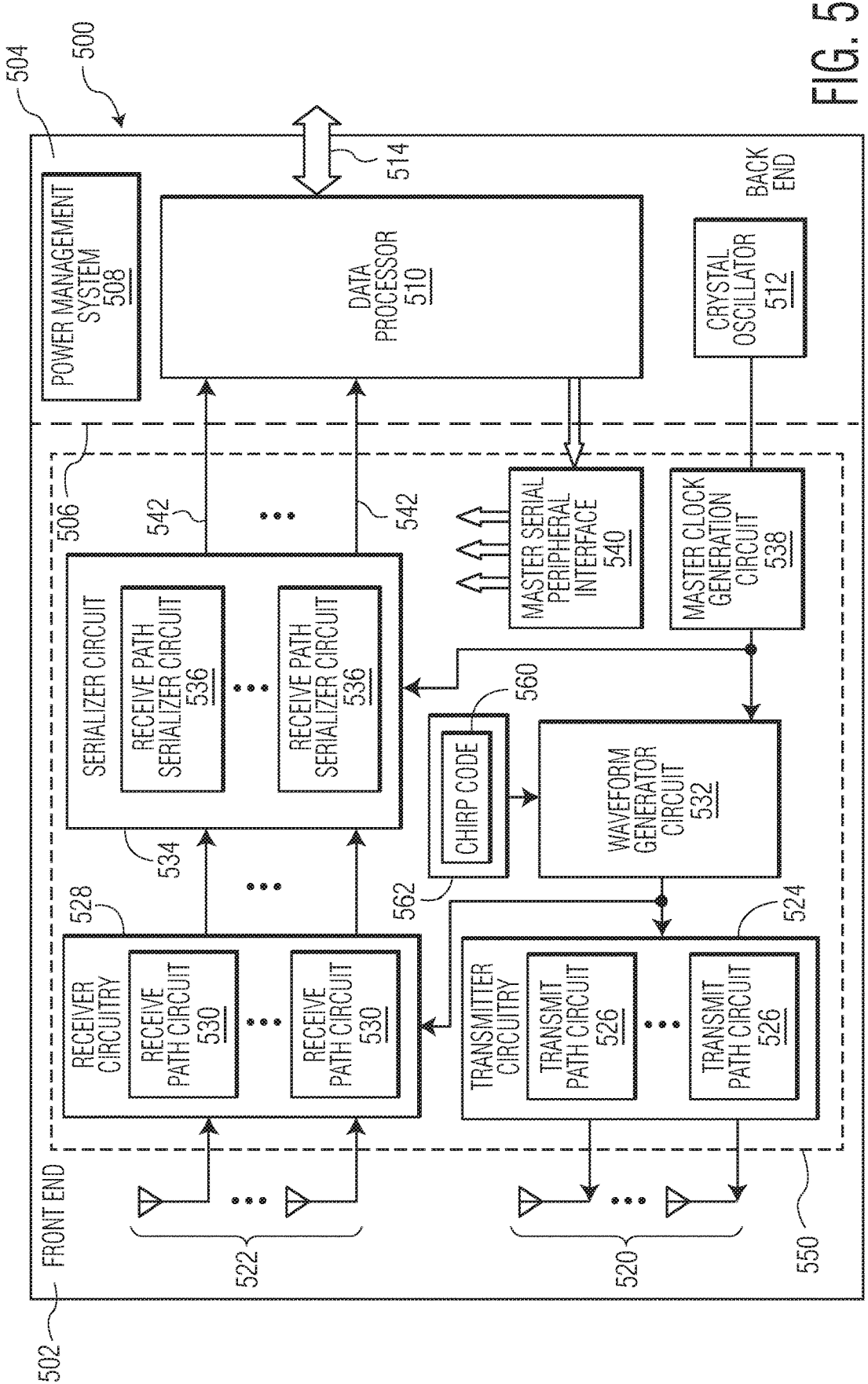
FIG. 5 depicts an example embodiment of a radar system that is configured to implement the above-described technique.

The above-described technique for creating unique repeating patterns of radar signals (e.g., encoding radar signals) is implemented in a radar system, such as a radar system that is deployed in a vehicle (e.g., an automobile) to implement, for example, safety and/or autonomous driving features. FIG. 5 depicts an example embodiment of a radar system 500 that is configured to implement the above-described technique. The radar system 500 generally includes a front end 502 and a back end 504 generally demarcated by dashed line 106. The back end 504 includes a power management system 508, a data processor 510, which may be a microprocessor, micro controller, digital signal processor, system on chip or similar or any combination thereof, a crystal oscillator 512, and a bus or other communications interface 514 via which the processor 510 can communicate with other parts of the back end (not shown) and/or with other systems or sub-systems of a vehicle. For example, interface 514 may provide an Ethernet, controller area network (CAN) or FlexRay communications interface. Various conventional parts of the radar system 500 are omitted for the sake of clarity of explanation. However, such parts will be apparent to a person of ordinary skill in the art. The radar system 500 is particularly suitable for automotive applications, however, the radar system can also be used in other applications.

The front end 502 is generally an analogue front end and includes one or more radar transmitter antennas 520 and one or more radar receiver antennas 522. The front end 502 also includes transmitter circuitry 524, including a respective transmit path circuit, 526, for each transmitter antenna. The front end 502 also includes receiver circuitry 528, including a receive path circuit 530 for each respective receiver antenna 522. A waveform generator circuit 532 is also provided and which supplies a master local oscillator (LO) signal to each of the transmitter and receiver circuits. A serializer circuit 534 is also provided and includes a respective receive path serializer circuit 536 for each receive path circuit. A master clock generation circuit 538 is also provided and receives a signal from a crystal oscillator 512 and outputs a master clock signal to the wave form generator 532 and also to the serializer circuit 534. A master serial peripheral interface 540 is also provided in communication with the data processor 510, via which the data processor 510 can communicate with various parts of the analogue front end. It will be appreciated that in other embodiments, another type of control bus can be used. The serializer circuit 534 includes line driver circuitry via which digitized data is transmitted in low voltage differential signaling (LVDS) serial format over a pair of lines, e.g. 542, to the data processor 510. It will be appreciated that in other embodiments, other types of serial data transmission can be used. Hence, the serializer circuit provides the general analogue to digital conversion and interface between the analogue front end and the digital data processor 510 being the digital base band. Although an example of a radar system is described with reference to FIG. 5, other embodiments of a radar system are contemplated.

In an embodiment, the transmitter circuitry 524, the receiver circuitry 528, the waveform generator 532, the serializer circuit 534, the master clock generator 538, and the master serial peripheral interface 540 are embodied as a packaged device 550. For example, the packaged device may include one or more integrated circuit (IC) devices that is/are packaged and sold as a distinct standalone packaged device that can be attached to a printed circuit board (PCB) along with other components to form a radar system.

In an embodiment, a chirp signal having a unique chirp pattern as described above is generated in the waveform generator 532. A radar signal is then generated by the transmitter circuit 124 according to the chirp signal and transmitted from at least one of the antenna 520. For example, a stream of chirp frames, with each frame having the same pattern of chirps, is transmitted from the radar system 500 as a radar signal. Radio frequency (RF) energy, which may include a reflected portion of the transmitted radar signal, is received by the antennas 522 and processed by the receiver circuitry 528 and the serializer circuit 534. In an embodiment, the serializer circuit is configured to select a signal from the received RF energy that matches the repeating pattern of chirps that was transmitted from the transmitter circuitry 524. In an embodiment, the selection of the signal that matches the repeating pattern of chirps can be implemented entirely in the receiver circuitry 528 and/or the serializer circuit 534 (e.g., on the IC device 550) and in another embodiment, the selection of the signal that matches the repeating pattern of chirps can be implemented entirely in the data processor 110. In still another embodiment, the selection of the signal that matches the repeating pattern of chirps can be implemented in some combination of the receiver circuitry 528, serializer circuit 534, and/or the data processor 110.

In an embodiment, the repeating pattern of chirps is communicated to the receiver circuitry 528 so that the receiver circuit can filter the incoming analog signals for signals that match the transmitted chirp pattern. With reference to the radar system 500 of FIG. 5, in an embodiment, a chirp code 560 is stored in a memory 562 (e.g., a one-time programmable (OTP) memory) that is integrated into the IC device 550, where the chirp code is a digital code that indicates the specifics of the chirp pattern, e.g., how many chirps per frame, the base frequency/frequencies, chirp bandwidth(s), and chirp duration(s). In an embodiment, the receiver circuitry uses the chirp code to program an analog filter that is used to at least partially select a signal that matches the repeating pattern of chirps. In an embodiment, the radar system is coherent (e.g., same pattern at the input of the transmitter and receiver) and the received signal is downconverted with knowledge of the chirp code. In an embodiment, at least a portion of the selection of a signal that matches the repeating pattern of chirps is done in software in the data processor 110 using the chirp code. In an embodiment, chirp codes for multiple different chirp patterns may be stored on OTP memory. In an embodiment, it is desirable to store the chirp code on the IC device so that the security of the chirp code can be ensured. In another embodiment, multiple different chirp codes are stored on the same IC device and a command is sent to the IC device to select or "activate" a particular chirp code. Although in one embodiment the chirp codes are stored on the IC device, it is possible that the chirp code is stored "off-chip" and communicated to the chip.

Figure 6:
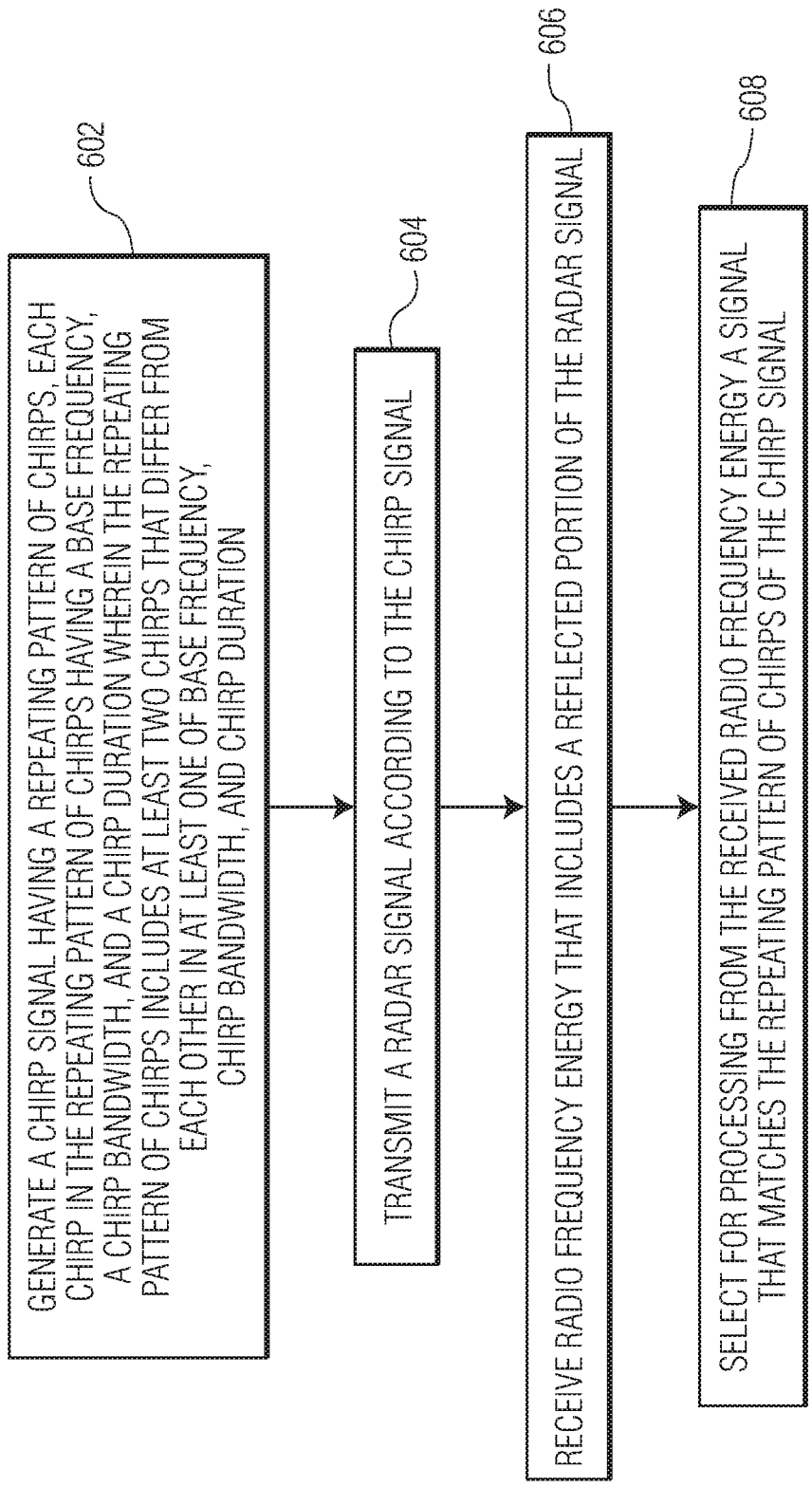
FIG. 6 is a process flow diagram of a method for operating a radar system in accordance with another embodiment of the invention.

FIG. 6 is a process flow diagram of a method for operating a radar system. According to the method, at block 602, a chirp signal having a repeating pattern of chirps is generated, each chirp in the repeating pattern of chirps having a base frequency, a chirp bandwidth, and a chirp duration, wherein the repeating pattern of chirps includes at least two chirps that differ from each other in at least one of base frequency, chirp bandwidth, and chirp duration. At block 604, a radar signal is transmitted according to the chirp signal. At block 606, radio frequency energy that includes a reflected portion of the radar signal is received. At block 608, a signal that matches the repeating pattern of chirps of the chirp signal is selected for processing from the received radio frequency energy. In an embodiment, the selection of the signal that matches the repeating pattern of chirps can be implemented entirely in the receiver circuitry 528 and/or the serializer circuit 534 (e.g., on the IC device 550) and in another embodiment, the selection of the signal that matches the repeating pattern of chirps can be implemented entirely in the data processor 110. In still another embodiment, the selection of the signal that matches the repeating pattern of chirps can be implemented in some combination of the receiver circuitry 528, serializer circuit 534, and/or the data processor 110.

As described herein, the concept of a unique chirp code or "fingerprint" being tied to a particular radar system (and thus to a particular vehicle), is much like a fingerprint is tied to a particular person. In an example use case, the radar system maker (or governing body) has control over the unique chirp patterns (fingerprints or "chirp code") in much the same way Internet Protocol (IP) addresses are distributed. In an embodiment, a chirp code can be embedded in a radar IC device to control uniqueness of the IC device. Thus, a radar system is coded with the unique pattern or "fingerprint." In an embodiment, a pattern of pre-defined frequency hops can be coded into a radar IC device by a manufacturer of the IC device, e.g., making use of OTP memory. In an embodiment, there can be only one fixed chirp pattern, or a limited number of fixed chirp patterns, stored on an IC device. In an embodiment, an IC device can be updatable "over the air" while the radar IC device is operated in a vehicle. In an embodiment, a chirp pattern starts after a silent period, which is long enough to be understood as "start of pattern" or after a specific "start pattern word," which is repetitive. In an embodiment, the selection process will allow each first vehicle to use (one of) its own individual radar pattern(s). In a "sea" of reflected radar signals, it is possible to filter for any first vehicle on its specific, individual chirp pattern. In operation, a transmitter of a radar system emits a radar pattern of base frequencies and chirp bandwidths over its antenna and selects from the received signals only those signals where signals fall in the same pattern of base frequencies and chirp bandwidths as were emitted by the same radar system. Using such a technique, multiple vehicles can transmit simultaneously in the same frequency band without creating debilitating interference as long as the vehicles use different chirp patterns.

Techniques described herein can be applied to various types of radar detection systems. In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating a radar system, the method comprising:
generating a chirp signal having a repeating pattern of chirps by accessing a chirp code stored by a manufacturer of the radar system in one time programmable memory of the radar system and generating the repeating pattern of chirps based on the chirp code, each chirp in the repeating pattern of chirps having a base frequency, a chirp bandwidth, and a chirp duration, wherein the repeating pattern of chirps includes at least two chirps that differ from each other in base frequency, chirp bandwidth, and chirp duration, wherein the chirp code is a digital code that specifies the base frequency, the chirp bandwidth, and the chirp duration of each chirp of the pattern of chirps, wherein the pattern of chirps starts after a repetitive start pattern and the radar system stores only one chirp code and generates only one repeating pattern of chirps based on the stored chirp code;
transmitting a radar signal according to the chirp signal;
receiving radio frequency energy that includes a reflected portion of the radar signal; and
selecting for processing from the received radio frequency energy a signal that matches the repeating pattern of chirps of the chirp signal; and
wherein other radar systems in a communication range with the radar system transmit a respective pattern of chirps, the pattern of chirps based on the chirp code being different from each one of the pattern of chirps transmitted by the other radar systems, the pattern of chirps transmitted by the other radar systems having a base frequency, chirp bandwidth, wait time between chirps, chirp duration, and number of chirps each different from the pattern of chirps based on the chirp code to avoid interference.

2. The method of claim 1, wherein the repeating pattern of chirps comprises a fixed number of chirps in each repeating pattern.

3. The method of claim 1, wherein the repeating pattern of chirps includes at least three chirps that have different base frequencies.

4. The method of claim 1, wherein the repeating pattern of chirps includes at least three chirps that have different chirp bandwidths.

5. The method of claim 1, wherein the repeating pattern of chirps includes at least three chirps that have different base frequencies and at least three chirps that have different chirp bandwidths.

6. The method of claim 1, wherein the repeating pattern of chirps comprises a fixed number of chirps in each repeating pattern and wherein the repeating pattern of chirps includes at least three chirps that have different base frequencies and at least three chirps that have different chirp bandwidths.

7. A radar system, the radar system comprising:
a waveform generator configured to generate a chirp signal having a repeating pattern of chirps by accessing a chirp code stored by a manufacturer of the radar system in one time programmable memory of the radar system and generating the repeating pattern of chirps based on the chirp code, each chirp in the repeating pattern of chirps having a base frequency, a chirp bandwidth, and a chirp duration, wherein the repeating pattern of chirps includes at least two chirps that differ from each other in base frequency, chirp bandwidth, and chirp duration, wherein the chirp code is a digital code that specifies the base frequency, the chirp bandwidth, and the chirp duration of each chirp of the pattern of chirps, wherein the pattern of chirps starts after a repetitive start pattern and the radar system stores only one chirp code and generates only one repeating pattern of chirps based on the stored chirp code;

transmitter circuitry configured to transmit a radar signal according to the chirp signal;

receiver circuitry configured to receive radio frequency energy that includes a reflected portion of the radar signal;

wherein the radar system selects, from the received radio frequency energy, a signal that matches the repeating pattern of chirps of the chirp signal; and wherein other radar systems in a communication range with the radar system transmit a respective pattern of chirps, the pattern of chirps based on the chirp code being different from each one of the pattern of chirps transmitted by the other radar systems, the pattern of chirps transmitted by the other radar systems having a base frequency, chirp bandwidth, wait time between chirps, chirp duration, and number of chirps each different from the pattern of chirps based on the chirp code to avoid interference.

8. The radar system of claim 7, wherein the repeating pattern of chirps comprises a fixed number of chirps in each repeating pattern.

9. The radar system of claim 7, wherein the repeating pattern of chirps includes at least three chirps that have different base frequencies.

10. The radar system of claim 7, wherein the repeating pattern of chirps includes at least three chirps that have different chirp bandwidths.

11. The radar system of claim 7, wherein the repeating pattern of chirps includes at least three chirps that have different base frequencies and at least three chirps that have different chirp bandwidths.

12. The radar system of claim 7, wherein the repeating pattern of chirps comprises a fixed number of chirps in each repeating pattern and wherein the repeating pattern of chirps includes at least three chirps that have different base frequencies and at least three chirps that have different chirp bandwidths.

13. A packaged device for a radar system, the packaged device comprising:

a waveform generator configured to generate a chirp signal having a repeating pattern of chirps by accessing a chirp code stored by a manufacturer of the radar system in one time programmable memory of the radar system and generating the repeating pattern of chirps based on the chirp code, each chirp in the repeating pattern of chirps having a base frequency, a chirp bandwidth, and chirp length, wherein the repeating pattern of chirps includes at least two chirps that differ from each other in base frequency, chirp bandwidth, and chirp length, wherein the chirp code is a digital code that specifies the base frequency, the chirp bandwidth, and the chirp duration of each chirp of the pattern of chirps, wherein the pattern of chirps starts after a repetitive start pattern and the radar system stores only one chirp code and generates only one repeating pattern of chirps based on the stored chirp code;

transmitter circuitry configured to transmit a radar signal according to the chirp signal; and receiver circuitry configured to receive radio frequency energy that includes a reflected portion of the radar signal wherein other radar systems in a communication range with the radar system transmit a respective pattern of chirps, the pattern of chirps based on the chirp code being different from each one of the pattern of chirps transmitted by the other radar systems, the pattern of chirps transmitted by the other radar systems having a base frequency, chirp bandwidth, wait time between chirps, chirp duration, and number of chirps each different from the pattern of chirps based on the chirp code to avoid interference.

14. The packaged device of claim 13, wherein the packaged device selects, from the received radio frequency energy, a signal that matches the repeating pattern of chirps of the chirp signal.

15. The packaged device of claim 13, wherein the repeating pattern of chirps comprises a fixed number of chirps in each repeating pattern.

16. The packaged device of claim 13, wherein the repeating pattern of chirps includes at least three chirps that have different base frequencies or at least three chirps that have different chirp bandwidths.

17. The packaged device of claim 13, wherein the repeating pattern of chirps includes at least three chirps that have different base frequencies and at least three chirps that have different chirp bandwidths.

18. The method of claim 1, further comprising receiving the chirp code via an update process over a wireless connection.

19. The method of claim 1, wherein a pool of patterns comprises patterns of chirps which are each different from each other, wherein the pattern of chirps based on the chirp code and each one of the pattern of chirps transmitted by the other radar systems are selected from the patterns of chirps in the pool, and wherein a number of the chirp patterns in the pool is based on a likelihood that the selected patterns of chirps transmitted by the other radar systems do not interfere with the selected pattern of chirps.

20. The method of claim 19, wherein a first pattern of chirps in the pool comprises a first chirp and second chirp with a first wait time between the first chirp and the second chirp and a second pattern of chirps in the pool comprises a third chirp and a fourth chirp with a second wait time between the third chirp and the fourth chirp; and wherein the first wait time and second wait time are different.

* * * * *